United States Patent
Xu et al.

(10) Patent No.: US 10,454,300 B2
(45) Date of Patent: Oct. 22, 2019

(54) UPS POWER SUPPLY

(71) Applicant: Vertiv Tech Co., Ltd., Shenzhen, Guangdong (CN)

(72) Inventors: Junrui Xu, Guangdong (CN); Yunhe Mao, Guangdong (CN); Fubin Xu, Guangdong (CN); Yang Bing, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 183 days.

(21) Appl. No.: 15/602,675

(22) Filed: May 23, 2017

(65) Prior Publication Data

US 2017/0373531 A1 Dec. 28, 2017

(30) Foreign Application Priority Data

Jun. 23, 2016 (CN) .......................... 2016 1 0460778

(51) Int. Cl.
*H02J 9/06* (2006.01)
*H02J 7/00* (2006.01)
(Continued)

(52) U.S. Cl.
CPC ................ *H02J 9/061* (2013.01); *H02J 1/10* (2013.01); *H02J 7/0068* (2013.01); *H02J 9/06* (2013.01); *H02M 3/135* (2013.01); *H02M 3/155* (2013.01)

(58) Field of Classification Search
None
See application file for complete search history.

(56) References Cited

U.S. PATENT DOCUMENTS 9,047,075 B1 6/2015 Lee
9,047,076 B1 6/2015 Lee
(Continued)

FOREIGN PATENT DOCUMENTS

CN 101951011 A 1/2011
CN 104158208 A 11/2014
(Continued)

OTHER PUBLICATIONS

Extended European Search Report of the European Patent Office, Munich, regarding Application No. 17173109.4 dated Dec. 19, 2017.

(Continued)

*Primary Examiner* — Jared Fureman
*Assistant Examiner* — Aqeel H Bukhari
(74) *Attorney, Agent, or Firm* — Harness, Dickey & Pierce, P.L.C.

(57) ABSTRACT

An Uninterrupted Power Supply (UPS) power supply system is provided, which includes: a filter module connected to a mains supply and configured to filter an input from the mains supply; a BOOST module, where a first terminal of the BOOST module is connected to the filter module via a first switch group and connected to a battery via a second switch group, and a second terminal of the BOOST module is connected to a positive bus and a negative bus; and a bi-directional Direct Current/Direct Current (DC/DC) module, where a first terminal of the bi-directional DC/DC module is connected to the battery, and a second terminal of the bi-directional DC/DC module is connected to the positive bus and the negative bus.

11 Claims, 2 Drawing Sheets

(51) Int. Cl.
*H02M 3/135* (2006.01)
*H02M 3/155* (2006.01)
*H02J 1/10* (2006.01)

(56) References Cited

U.S. PATENT DOCUMENTS

| | | |
|---|---|---|
| 9,444,280 B2 | 9/2016 | Lee |
| 9,509,158 B2 | 11/2016 | Lee |
| 9,537,341 B2 | 1/2017 | Lee |
| 9,537,351 B2 | 1/2017 | Lee et al. |
| 9,787,209 B2 | 10/2017 | Dighrasker et al. |
| 9,793,711 B2 | 10/2017 | Augesky et al. |
| 2004/0125626 A1* | 7/2004 | Kanouda ................ H02J 9/061 363/125 |
| 2011/0095727 A1 | 4/2011 | Yeh et al. |
| 2015/0022003 A1 | 1/2015 | Dighrasker et al. |
| 2015/0188349 A1 | 7/2015 | Lee |
| 2015/0349585 A1 | 12/2015 | Budde et al. |
| 2015/0380968 A1 | 12/2015 | Lee |
| 2016/0006351 A1 | 1/2016 | Augesky et al. |
| 2016/0049822 A1 | 2/2016 | Lee |
| 2016/0154716 A1 | 6/2016 | Lee et al. |
| 2016/0204654 A1* | 7/2016 | Mondal ................ H02J 9/066 307/67 |
| 2016/0233720 A1 | 8/2016 | Lee et al. |
| 2017/0133857 A1 | 5/2017 | Sun et al. |
| 2017/0149346 A1 | 5/2017 | Mouridsen |

FOREIGN PATENT DOCUMENTS

| | | |
|---|---|---|
| EP | 2624399 A1 | 8/2013 |
| EP | 2889985 A2 | 7/2015 |
| JP | 2007312544 A | 11/2007 |
| WO | WO-2013122581 A1 | 8/2013 |
| WO | WO-2015199718 A1 | 12/2015 |

OTHER PUBLICATIONS

First Chinese Office Action regarding Application No. 201610460778.X dated Mar. 22, 2019. English translation provided by Unitalen Attorneys at Law.

* cited by examiner

UPS POWER SUPPLY

This application claims priority to Chinese Patent Application No. 201610460778.X, filed on Jun. 23, 2016, which is hereby incorporated by reference in its entirety.

FIELD

The disclosure relates to the field of Uninterruptable Power System (UPS), and particularly to a UPS power supply.

BACKGROUND

A conventional UPS power supply charges and discharges by means of a Direct Current/Direct Current (DC/DC) converter, or discharges by multiplexing a BOOST circuit of a rectifier and charges by multiplexing a double-BUCK circuit of the rectifier, thereby supplying an output voltage to a load. However, in a case that the UPS power supply discharges by means of only the DC/DC converter, a large discharge power is required in order to satisfy the load requirement, thus the switching loss is significant. In addition, the DC/DC converter is bulky and costly, and device utilization and system power density of the entire UPS power supply is relatively low. In a case that the UPS power supply discharges by multiplexing the BOOST circuit of the rectifier, high efficiency operation cannot be ensured in both a mains supply mode and a battery supply mode. Further, there is a problem that a high demand is put on the bus capacitor during switching.

SUMMARY

The technical issue to be solved by the disclosure is that, in view of the above mentioned drawbacks of the prior art, a UPS power supply system is provided which can efficiently reduce the switching loss, improve the system efficiency, and achieve uninterrupted switching between the mains supply and the battery thereby avoiding the period during which the bus alone supports the load.

In order to address the above technical issue, the following technical solution is adopted. A UPS power supply system is constructed, which includes:

a filter module connected to a mains supply and configured to filter an input from the mains supply;

a BOOST module, where a first terminal of the BOOST module is connected to the filter module via a first switch group and connected to a battery via a second switch group, and a second terminal of the BOOST module is connected to a positive bus and a negative bus; and a bi-directional DC/DC module, where a first terminal of the bi-directional DC/DC module is connected to the battery, and a second terminal of the bi-directional DC/DC module is connected to the positive bus and the negative bus, where in a battery supply mode, in a case that an output power is smaller than a first power, only the bi-directional DC/DC module discharges; in a case that the output power is greater than the first power and smaller than a second power, only the BOOST module discharges; and in a case that the output power is greater than the second power, the bi-directional DC/DC module and the BOOST module both discharge.

In the UPS power supply system according the disclosure, the BOOST module may include a first inductor, a second inductor, a third inductor, a first switch transistor, a second switch transistor, a third switch transistor, a fourth switch transistor, a fifth switch transistor, a sixth switch transistor, a first diode, a second diode, a third diode, a fourth diode, a fifth diode and a sixth diode, where a first terminal of the first inductor is connected to a first terminal of the first switch group, and a second terminal of the first inductor is connected to an anode of the first diode, a cathode of the fourth diode and a first terminal of the first switch transistor; a first terminal of the second inductor is connected to a second terminal of the first switch group, and a second terminal of the second inductor is connected to an anode of the second diode, a cathode of the fifth diode and a first terminal of the second switch transistor; a first terminal of the third inductor is connected to a third terminal of the first switch group, and a second terminal of the third inductor is connected to an anode of the third diode, a cathode of the sixth diode and a first terminal of the third switch transistor; a cathode of the first diode, a cathode of the second diode and a cathode of the third diode are connected to the positive bus, and an anode of the fourth diode, an anode of the fifth diode and an anode of the sixth diode are connected to the negative bus; a second terminal of the first switch transistor is connected to a second terminal of the fourth switch transistor, a second terminal of the second switch transistor is connected to a second terminal of the fifth switch transistor, and a second terminal of the third switch transistor is connected to a second terminal of the sixth switch transistor; a first terminal of the fourth switch transistor, a first terminal of the fifth switch transistor and a first terminal of the sixth switch transistor are grounded; and a third terminal of the first switch transistor, a third terminal of the second switch transistor, a third terminal of the third switch transistor, a third terminal of the fourth switch transistor, a third terminal of the fifth switch transistor and a third terminal of the sixth switch transistor are connected with a control signal.

In the UPS power supply system according the disclosure, the BOOST module may further include a first capacitor and a second capacitor, where a first terminal of the first capacitor is connected to the positive bus, and a second terminal of the first capacitor is grounded; and a first terminal of the second capacitor is connected to the negative bus, and a second terminal of the second capacitor is grounded.

In the UPS power supply system according the disclosure, the bi-directional DC/DC module may include a seventh switch transistor, an eighth switch transistor, a fourth inductor and a third capacitor, where a first terminal of the third capacitor is connected to a positive electrode of the battery, a second terminal of the third capacitor is connected to a negative electrode of the battery; a first terminal of the fourth inductor is connected to the positive electrode of the battery, a second terminal of the fourth inductor is connected to a second terminal of the seventh switch transistor and a first terminal of the eighth switch transistor; a first terminal of the seventh switch transistor is connected to the positive bus, and a second terminal of the eighth switch transistor is connected to the negative bus; and a third terminal of the seventh switch transistor and a third terminal of the eighth switch transistor are connected with a control signal.

In the UPS power supply system according the disclosure, the bi-directional DC/DC module may further include a ninth switch transistor, a tenth switch transistor and a fifth inductor, where a first terminal of the ninth switch transistor is connected to the positive bus, and a second terminal of the ninth switch transistor is connected to a first terminal of the tenth switch transistor; a second terminal of the tenth switch transistor is connected to the negative bus; a first terminal of the fifth inductor is connected to the positive electrode of the battery, and a second terminal of the fifth inductor is connected to the second terminal of the ninth switch transistor and the first terminal of the tenth switch transistor; and a third terminal of the ninth switch transistor and a third terminal of the tenth switch transistor are connected with the control signal.

In the UPS power supply system according the disclosure, the bi-directional DC/DC module may further include a fourth capacitor, where a first terminal of the fourth capacitor is connected to the positive bus, and a second terminal of the fourth capacitor is connected to the negative bus.

In the UPS power supply system according the disclosure, the first switch group may include a first switch, a second switch and a third switch, where a first terminal of the first switch is connected to the first terminal of the first switch group, a first terminal of the second switch is connected to the second terminal of the first switch group, and a first terminal of the third switch is connected to the third terminal of the first switch group; and a second terminal of the first switch is connected to a first output terminal of the filter module, a second terminal of the second switch is connected to a second output terminal of the filter module, and a second terminal of the third switch is connected to a third output terminal of the filter module.

In the UPS power supply system according the disclosure, the second switch group may include a first bi-directional switch and a second bi-directional switch, where a first terminal of the first bi-directional switch is connected to the positive electrode of the battery, and a second terminal of the first bi-directional switch is connected to the first terminal of the first switch group; and a first terminal of the second bi-directional switch is connected to the negative electrode of the battery, and a second terminal of the second bi-directional switch is connected to the second terminal or the third terminal of the first switch group.

In the UPS power supply system according the disclosure, each of the first bi-directional switch and the second bi-directional switch may include two thyristors connected in anti-parallel with each other.

In the UPS power supply system according the disclosure, the filter module may include a sixth inductor, a seventh inductor, an eighth inductor, a fifth capacitor, a sixth capacitor and a seventh capacitor, where the sixth inductor is connected between a first input terminal of the mains supply and a fourth terminal of the first switch group, the seventh inductor is connected between a second input terminal of the mains supply and a fifth terminal of the first switch group, the eighth inductor is connected between a third input terminal of the mains supply and a sixth terminal of the first switch group, the fifth capacitor is connected between the fourth terminal of the first switch group and the ground, the sixth capacitor is connected between the fifth terminal of the first switch group and the ground, and the seventh capacitor is connected between the sixth terminal of the first switch group and the ground.

With the UPS power supply system according to the disclosure, only the bi-directional DC/DC module is used for discharging and supplying power in a low output power, only the BOOST module is used for discharging and supplying power in a medium output power, and both the bi-directional DC/DC module and the BOOST module are used for discharging and supplying power in a high output power, thus the switching loss can be reduced, the power efficiency can be improved, and uninterrupted switching between the mains supply and the battery can be achieved without the bus alone supporting the load.

BRIEF DESCRIPTION OF THE DRAWINGS

In the following, the disclosure is described in detail in conjunction with drawings and embodiments. In the drawings.

DETAILED DESCRIPTION OF THE EMBODIMENTS

Figure 1:
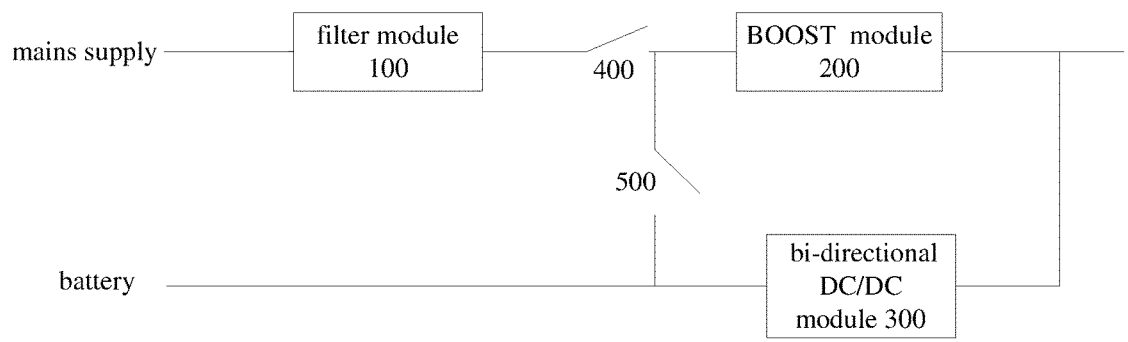
FIG. 1 is a functional block diagram of a UPS power supply according to a first embodiment of the disclosure.

FIG. 1 is a functional block diagram of a UPS power supply according to a first embodiment of the disclosure. As shown in FIG. 1, the UPS power supply according to the disclosure includes a filter module 100, a BOOST module 200, a bi-directional DC/DC module 300, a first switch group 400 and a second switch group 500. The filter module 100 is connected to a mains supply and configured to filter an input from the mains supply. A first terminal of the BOOST module 200 is connected to the filter module 100 via the first switch group 400 and connected to a battery via the second switch group 500. A second terminal of the BOOST module 200 is connected to a positive bus and a negative bus. A first terminal of the bi-directional DC/DC module 300 is connected to the battery, and a second terminal of the bi-directional DC/DC module 300 is connected to the positive bus and the negative bus.

In the present disclosure, the filter module 100 may be constructed using any filter circuit or filter module known in the art, such as a LC filter circuit or a LCL filter circuit. The BOOST module 200 may be constructed using any BOOST circuit or BOOST module known in the art. The bi-directional DC/DC module 300 is a bi-directional DC/DC module which may be constructed using any DC/DC converter known in the art. The first switch group 400 includes one or more switching devices respectively connected to the filter module and the BOOST module, thereby controlling connection and disconnection between the filter module and the BOOST module. The second switch group 500 includes one or more switching devices respectively connected to the battery and the BOOST module, thereby controlling connection and disconnection between the battery and the BOOST module.

When the mains supply is normal, a mains supply mode is adopted. The mains supply is filtered by the filter module 100 and then supplied to the BOOST module 200. The inputted voltage is boosted by the BOOST module 200 and outputted to a load thereby supplying power to the load.

When the mains supply is powered down, a battery supply mode is adopted. Power from the battery is supplied via the bi-directional DC/DC module 300 and/or the BOOST module 200. Here, a power capacity of the bi-directional DC/DC module 300 is denoted as C KW, and a power capacity of the BOOST module 200 is denoted as B KW, where C is smaller than B. In a case that an output power is smaller than (or smaller than or equal to) C KW, only the bi-directional DC/DC module discharges; in a case that the output power is greater than C KW and smaller than (or smaller than or equal to) B KW, only the BOOST module discharges; and in a case that the output power is greater than (or greater than or equal to) B KW, the bi-directional DC/DC module and the BOOST module both discharge.

In a case that the output power is smaller than C KW, power can be supplied by only the bi-directional DC/DC module 300; in a case that the output power is greater than C KW and smaller than B KW, power can be supplied by only the BOOST module 200; and in a case that the output power is greater than B KW, power can be supplied by both the BOOST module 200 and the bi-directional DC/DC module 300, thus the discharger loss can be reduced. In addition, when the output power is smaller than C KW, continuous power walk-in can be achieved, thereby significantly reducing or even eliminating the interruption period when the power supply is switched, thus the demand on the bus capacitor during switching can be reduced. The bi-directional DC/DC module 300, which is simple in structure, cost-effective, highly efficient and reliable, can accomplish a boost discharge function and a buck charging function.

Figure 2:
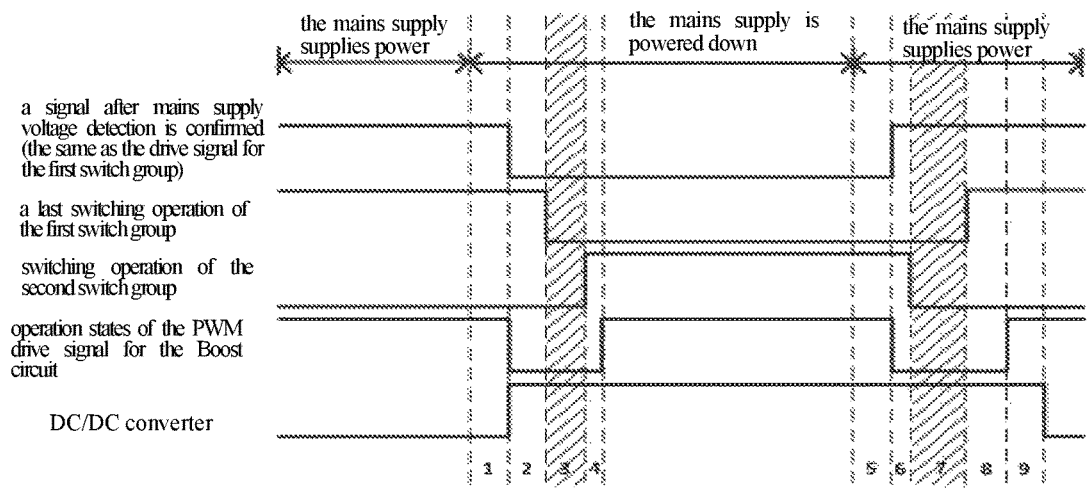
FIG. 2 is a schematic diagram illustrating the power supplied when the UPS power supply is switched between the mains supply and the battery according to the disclosure.

FIG. 2 is a schematic diagram illustrating the power supplied when the UPS power supply is switched between the mains supply and the battery. Referring to FIG. 2, period 1 in FIG. 2 is a period for confirming that the mains supply is powered down; period 2 is a period from a time at which switching devices in the first switch group receive an off signal to a time at which all the switching devices in the first switch group are turned off, which is also referred to as a switch turn-off delay period; period 3 is a period from a time at which the switching devices of the first switch group are turned off to a time at which all the switching devices of the second switch group are turned on, which is also referred to as a switching interruption period, during which the load is supported by the bus capacitor in the conventional technology; period 4 is a period during which a drive signal for the BOOST module delays; period 5 is a period for confirming that the mains supply is powered on; period 6 is a period from a time at which a PWM drive signal for the BOOST module is stopped to a time at which all the switching devices in the second switch group are turned off; period 7 is an interruption period from a time at which the BOOST module stops discharging to a time at which all the switching devices in the first switch group are turned on, during which the load is supported by the bus capacitor in the conventional technology; period 8 is a period during which the drive signal for the BOOST module delays; and period 9 is a period during which power is supplied by the mains supply in combination with the bi-directional DC/DC module 300.

As can be seen from FIG. 2, if the battery discharges in the conventional manner, there is an interruption period when the power supply is switched from the mains supply to the battery, during which power needs to be supplied by the bus capacitor, thereby putting a high demand on the bus capacitor. However, with the UPS power supply according to the disclosure, in which the BOOST module 200 and the bi-directional DC/DC module 300 are connected in parallel for discharging, the bi-directional DC/DC module 300 can rapidly function after the mains supply is powered off, so that the battery starts to supply power, and stop functioning after the first switch group is completely turned on when the mains supply is restored, thus the period during which only the bus supplies power to the load can be greatly reduced, and the demand on the bus capacitor can be reduced. Further, the solution according to the disclosure that the BOOST module 200 and the bi-directional DC/DC module 300 are connected in parallel for discharging may eliminate the need for a silicon-controlled structure, thereby increasing the efficiency in the battery supply mode, thus the problem of high switch transistor loss can be solved.

In a preferred embodiment of the disclosure, the bi-directional DC/DC module 300 may be designed to have an overload capability which is about 2 times of its rated power, thereby ensuring that an impact current is not generated when switching the discharging mode in most operation conditions, thus the voltage on the bus can be stabilized.

Figure 3:
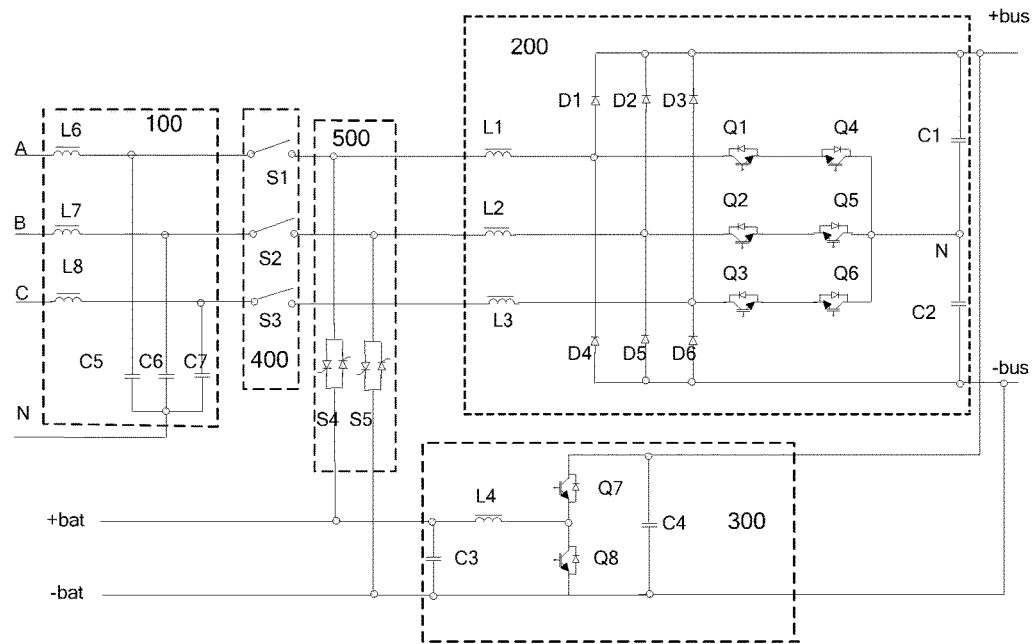
FIG. 3 is a schematic diagram illustrating a circuit of a UPS power supply according to a second embodiment of the disclosure.

FIG. 3 is a schematic diagram illustrating a circuit of a UPS power supply according to a second embodiment of the disclosure. As shown in FIG. 3, the UPS power supply according to the disclosure includes a filter module 100, a BOOST module 200, a bi-directional DC/DC module 300, a first switch group 400 and a second switch group 500.

As shown in FIG. 3, the BOOST module includes an inductor L1, an inductor L2, an inductor L3, a switch transistor Q1, a switch transistor Q2, a switch transistor Q3, a switch transistor Q4, a switch transistor Q5, a switch transistor Q6, a diode D1, a diode D2, a diode D3, a diode D4, a diode D5, a diode D6, a capacitor C1 and a capacitor C2. The bi-directional DC/DC module includes a switch transistor Q7, a switch transistor Q8, an inductor L4, a capacitor C3 and a capacitor C4. The first switch group includes a switch S1, a switch S2 and a switch S3. The second switch group includes a switch S4 and a switch S5. The filter module includes an inductor L6, an inductor L7, an inductor L8, a capacitor C5, a capacitor C6 and a capacitor C7. In this embodiment, each of the switch transistor Q1, the switch transistor Q2, the switch transistor Q3, the switch transistor Q4, the switch transistor Q5 and the switch transistor Q6 is an IGBT transistor. In other embodiments of the disclosure, the switch transistor Q1, the switch transistor Q2, the switch transistor Q3, the switch transistor Q4, the switch transistor Q5 and the switch transistor Q6 may be other switch transistors such as MOS transistors, the disclosure is not limited by the type of the switch transistor.

As shown in FIG. 3, the inductor L6 is connected between a first input terminal A of the mains supply and a first terminal of the first switch S1, the inductor L7 is connected between a second input terminal B of the mains supply and a first terminal of the second switch S2, the inductor L8 is connected between a third input terminal C of the mains supply and a first terminal of the third switch S3, the capacitor C5 is connected between the first terminal of the first switch S1 and the ground, the capacitor C6 is connected between the first terminal of the second switch S2 and the ground, and the capacitor C7 is connected between the first terminal of the third switch S3 and the ground.

A first terminal of the inductor L1 is connected to a second terminal of the first switch S1, and a second terminal of the inductor L1 is connected to an anode of the diode D1, a cathode of the diode D4 and a collector electrode of the IGBT transistor Q1. A first terminal of the inductor L2 is connected to a second terminal of the second switch S2, and a second terminal of the inductor L2 is connected to an anode of the diode D2, a cathode of the diode D5 and a collector electrode of the IGBT transistor Q2. A first terminal of the inductor L3 is connected to a second terminal of the third switch S3, and a second terminal of the inductor L3 is connected to an anode of the diode D3, a cathode of the diode D6 and a collector electrode of the IGBT transistor Q3. A cathode of the diode D1, a cathode of the diode D2 and a cathode of the diode D3 are connected to the positive bus +bus. An anode of the diode D4, an anode of the diode D5 and an anode of the diode D6 are connected to the negative bus −bus. An emitter electrode of the IGBT transistor Q1 is connected to an emitter electrode of the IGBT transistor Q4, an emitter electrode of the IGBT transistor Q2 is connected to an emitter electrode of the IGBT transistor Q5, and an emitter electrode of the IGBT transistor Q3 is connected to an emitter electrode of the IGBT transistor Q6. A collector electrode of the IGBT transistor Q4, a collector electrode of the IGBT transistor Q5 and a collector electrode of the IGBT transistor Q6 are grounded; and a gate electrode of the IGBT transistor Q1, a gate electrode of the IGBT transistor Q2, a gate electrode of the IGBT transistor Q3, a gate electrode of the IGBT transistor Q4, a gate electrode of the IGBT transistor Q5 and a gate electrode of the IGBT transistor Q6 are connected with a control signal. A positive terminal of the capacitor C1 is connected to the positive bus +bus, and a negative terminal of the capacitor C1 is grounded; and a negative terminal of the capacitor C2 is connected to the negative bus −bus, and a positive terminal of the capacitor C2 is grounded. A positive terminal of the capacitor C3 is connected to a positive electrode of the battery +bat, a negative terminal of the capacitor C3 is connected to a negative electrode of the battery −bat. A first terminal of the inductor L4 is connected to the positive electrode of the battery +bat, and a second terminal of the inductor L4 is connected to an emitter electrode of the IGBT transistor Q7 and a collector electrode of the IGBT transistor Q8. A collector electrode of the IGBT transistor Q7 is connected to the positive bus +bus, and an emitter electrode of the IGBT transistor Q8 is connected to the negative bus −bus. A gate electrode of the IGBT transistor Q7 and a gate electrode of the IGBT transistor Q8 are connected with a control signal. A first terminal of the capacitor C4 is connected to the positive bus +bus, and a second terminal of the capacitor C4 is connected to the negative bus −bus.

A first terminal of the first bi-directional switch S4 is connected to the positive electrode of the battery +bat, and a second terminal of the first bi-directional switch S4 is connected to the second terminal of the switch S1. A first terminal of the second bi-directional switch S5 is connected to the negative electrode of the battery −bat, and a second terminal of the second bi-directional switch S5 is connected to the second terminal of the switch S2. Each of the first bi-directional switch S4 and the second bi-directional switch S5 includes two thyristors connected in anti-parallel with each other. In other embodiments of the disclosure, the first bi-directional switch S4 and the second bi-directional switch S5 may be connected to other switches, as long as they are connected to two phases of the three phases of the mains supply.

In the embodiment shown in FIG. 3, in a case that power is supplied by the mains supply on main paths, i.e., switches S1 to S3 are turned on, the mains supply is filtered by the filter module 100 and inputted into the BOOST module 200, which perform an efficient power conversion. In a case that power is supplied by the battery, most of the loads are carried by the BOOST module 200, and the rest are carried by the bi-directional DC/DC module 300, where a specific proportion between the loads carried by the two modules may be adjusted depending on requirements.

For example, the power capacity of the bi-directional DC/DC module 300 is C KW, and the power capacity of the BOOST module 200 is B KW, where C is smaller than B. In a case that an output power is smaller than (or smaller than or equal to) C KW, only the bi-directional DC/DC module discharges; in a case that the output power is greater than C KW and smaller than (or smaller than or equal to) B KW, only the BOOST module discharges; and in a case that the output power is greater than (or greater than or equal to) B KW, the bi-directional DC/DC module and the BOOST module both discharge. Thus, a discharger loss can be reduced. In addition, when the output power is smaller than C KW, continuous power walk-in can be achieved, thereby significantly reducing or even eliminating the interruption period when the power supply is switched, thus the demand on the bus capacitor during switching can be reduced.

Therefore, as compared with the conventional UPS power supply which charges and discharges by means of a DC/DC converter, or multiplexes discharging by the BOOST circuit of the rectifier and charging by the double-BUCK circuit, the UPS power supply according to the disclosure in which the BOOST module 200 and the bi-directional DC/DC module 300 are connected in parallel for discharging uses less power devices and eliminates the need for N (Neutral) lines, thus the loss is significantly reduced and the efficiency is improved while the cost does not change much.

In a simplified embodiment of the disclosure, the capacitor C4 can be omitted. In other preferred embodiments of the disclosure, the battery can be connected to any two phases of the three phases of the mains supply via the first bi-directional switch S4 and the second bi-directional switch S5. The switches S1 to S3 may be any switching devices known in the art such as relays and thyristors.

Figure 4:
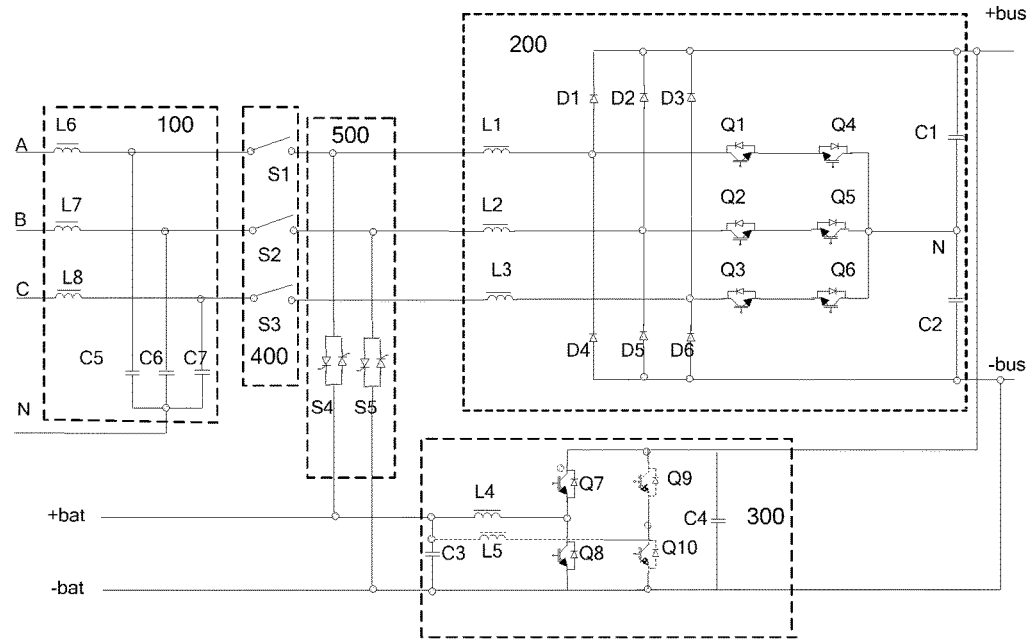
FIG. 4 is a schematic diagram illustrating a circuit of a UPS power supply according to a third embodiment of the disclosure.

FIG. 4 is a schematic diagram illustrating a circuit of a UPS power supply according to a third embodiment of the disclosure. As shown in FIG. 4, the UPS power supply according to the disclosure includes a filter module 100, a BOOST module 200, a bi-directional DC/DC module 300, a first switch group 400 and a second switch group 500. The embodiment shown in FIG. 4 is basically the same as the embodiment shown in FIG. 3, except for the configuration of the bi-directional DC/DC module 300. In the following, only the configuration of the bi-directional DC/DC module 300 will be described here.

The bi-directional DC/DC module includes a switch transistor Q7, a switch transistor Q8, an inductor L4, a capacitor C3, a capacitor C4, a switch transistor Q9, a switch transistor Q10, and an inductor L5. A positive terminal of the capacitor C3 is connected to the positive electrode of the battery +bat, and a negative terminal of the capacitor C3 is connected to the negative electrode of the battery −bat. A first terminal of the inductor L4 is connected to the positive electrode of the battery +bat, and a second terminal of the inductor L4 is connected to an emitter electrode of the IGBT transistor Q7 and a collector electrode of the IGBT transistor Q8. A collector electrode of the IGBT transistor Q7 is connected to the positive bus +bus, and an emitter electrode of the IGBT transistor Q8 is connected to the negative bus −bus. A gate electrode of the IGBT transistor Q7 and a gate electrode of the IGBT transistor Q8 are connected with a control signal. A first terminal of the capacitor C4 is connected to the positive bus +bus, and a second terminal of the capacitor C4 is connected to the negative bus −bus. A collector electrode of the switch transistor Q9 is connected to the positive bus +bus, an emitter electrode of the switch transistor Q9 is connected to a collector electrode of the switch transistor Q10, and an emitter electrode of the switch transistor Q10 is connected to the negative bus −bus. A first terminal of the inductor L5 is connected to the positive electrode of the battery +bat, and a second terminal of the inductor L5 is connected to the emitter electrode of the switch transistor Q9 and the collector electrode of the switch transistor Q10. A gate electrode of the switch transistor Q9 and a gate electrode of the switch transistor Q10 are connected with the control signal.

In the embodiment shown in FIG. 4, the bi-directional DC/DC module is an interleaved parallel-connected half-bridge DC/DC converter, where an interleaved parallel-connected structure can effectively eliminate harmonic currents thereby improving the conversion efficiency. The operation principle of the embodiment shown in FIG. 4 is the same as the operation principle of the embodiments shown in FIGS. 2 and 3, and is omitted here.

While the present disclosure has been described with reference to particular embodiments, it will be understood by those skilled in the art that various changes may be made and equivalents may be substituted without departing from the scope of the present disclosure. Therefore, the present disclosure is not limited to the particular embodiment disclosed, but will include all embodiments falling within the scope of the appended claims.

The invention claimed is:

1. An Uninterrupted Power Supply (UPS) power supply system, comprising:
a filter module connected to a mains supply and configured to filter an input from the mains supply;
a BOOST module, wherein a first terminal of the BOOST module is connected to the filter module via a first switch group and connected to a battery via a second switch group, and a second terminal of the BOOST module is connected to a positive bus and a negative bus; and
a bi-directional Direct Current/Direct Current (DC/DC) module, wherein a first terminal of the bi-directional DC/DC module is connected to the battery, and a second terminal of the bi-directional DC/DC module is connected to the positive bus and the negative bus,
wherein in a battery supply mode:
in a case that an output power is smaller than a first power, only the bi-directional DC/DC module discharges;
in a case that the output power is greater than the first power and smaller than a second power, only the BOOST module discharges; and
in a case that the output power is greater than the second power, the bi-directional DC/DC module and the BOOST module both discharge,
wherein the BOOST module comprises:
a first inductor, a second inductor, a third inductor, a first switch transistor, a second switch transistor, a third switch transistor, a fourth switch transistor, a fifth switch transistor, a sixth switch transistor, a first diode, a second diode, a third diode, a fourth diode, a fifth diode, and a sixth diode, wherein:
a first terminal of the first inductor is connected to a first terminal of the first switch group, and a second terminal of the first inductor is connected to an anode of the first diode, a cathode of the fourth diode and a first terminal of the first switch transistor;
a first terminal of the second inductor is connected to a second terminal of the first switch group, and a second terminal of the second inductor is connected to an anode of the second diode, a cathode of the fifth diode and a first terminal of the second switch transistor;
a first terminal of the third inductor is connected to a third terminal of the first switch group, and a second terminal of the third inductor is connected to an anode of the third diode, a cathode of the sixth diode and a first terminal of the third switch transistor;
a cathode of the first diode, a cathode of the second diode and a cathode of the third diode are connected to the positive bus, and an anode of the fourth diode, an anode of the fifth diode and an anode of the sixth diode are connected to the negative bus;
a second terminal of the first switch transistor is connected to a second terminal of the fourth switch transistor, a second terminal of the second switch transistor is connected to a second terminal of the fifth switch transistor, and a second terminal of the third switch transistor is connected to a second terminal of the sixth switch transistor;
a first terminal of the fourth switch transistor, a first terminal of the fifth switch transistor and a first terminal of the sixth switch transistor are grounded; and
a third terminal of the first switch transistor, a third terminal of the second switch transistor, a third terminal of the third switch transistor, a third terminal of the fourth switch transistor, a third terminal of the fifth switch transistor and a third terminal of the sixth switch transistor are connected with a control signal.

2. The UPS power supply system according to claim 1, wherein the BOOST module further comprises a first capacitor and a second capacitor,
wherein a first terminal of the first capacitor is connected to the positive bus, and a second terminal of the first capacitor is grounded; and a first terminal of the second capacitor is connected to the negative bus, and a second terminal of the second capacitor is grounded.

3. The UPS power supply system according to claim 2, wherein the bi-directional DC/DC module comprises a seventh switch transistor, an eighth switch transistor, a fourth inductor and a third capacitor,
wherein a first terminal of the third capacitor is connected to a positive electrode of the battery, a second terminal of the third capacitor is connected to a negative electrode of the battery; a first terminal of the fourth inductor is connected to the positive electrode of the battery, a second terminal of the fourth inductor is connected to a second terminal of the seventh switch transistor and a first terminal of the eighth switch transistor; a first terminal of the seventh switch transistor is connected to the positive bus, and a second terminal of the eighth switch transistor is connected to the negative bus; and a third terminal of the seventh switch transistor and a third terminal of the eighth switch transistor are connected with a control signal.

4. The UPS power supply system according to claim 1, wherein the bi-directional DC/DC module comprises a seventh switch transistor, an eighth switch transistor, a fourth inductor and a third capacitor,
wherein a first terminal of the third capacitor is connected to a positive electrode of the battery, a second terminal of the third capacitor is connected to a negative electrode of the battery; a first terminal of the fourth inductor is connected to the positive electrode of the battery, a second terminal of the fourth inductor is connected to a second terminal of the seventh switch transistor and a first terminal of the eighth switch transistor; a first terminal of the seventh switch transistor is connected to the positive bus, and a second terminal of the eighth switch transistor is connected to the negative bus; and a third terminal of the seventh switch transistor and a third terminal of the eighth switch transistor are connected with a control signal.

5. The UPS power supply system according to claim 4, wherein the bi-directional DC/DC module further comprises a ninth switch transistor, a tenth switch transistor and a fifth inductor,
    wherein a first terminal of the ninth switch transistor is connected to the positive bus, and a second terminal of the ninth switch transistor is connected to a first terminal of the tenth switch transistor; a second terminal of the tenth switch transistor is connected to the negative bus; a first terminal of the fifth inductor is connected to the positive electrode of the battery, and a second terminal of the fifth inductor is connected to the second terminal of the ninth switch transistor and the first terminal of the tenth switch transistor; and a third terminal of the ninth switch transistor and a third terminal of the tenth switch transistor are connected with the control signal.

6. The UPS power supply system according to claim 5, wherein the bi-directional DC/DC module further comprises a fourth capacitor,
    wherein a first terminal of the fourth capacitor is connected to the positive bus, and a second terminal of the fourth capacitor is connected to the negative bus.

7. The UPS power supply system according to claim 4, wherein the first switch group comprises a first switch, a second switch and a third switch,
    wherein a first terminal of the first switch is connected to the first terminal of the first switch group, a first terminal of the second switch is connected to the second terminal of the first switch group, and a first terminal of the third switch is connected to the third terminal of the first switch group; and a second terminal of the first switch is connected to a first output terminal of the filter module, a second terminal of the second switch is connected to a second output terminal of the filter module, and a second terminal of the third switch is connected to a third output terminal of the filter module.

8. The UPS power supply system according to claim 4, wherein the second switch group comprises a first bi-directional switch and a second bi-directional switch,
    wherein a first terminal of the first bi-directional switch is connected to the positive electrode of the battery, and a second terminal of the first bi-directional switch is connected to the first terminal of the first switch group; and a first terminal of the second bi-directional switch is connected to the negative electrode of the battery, and a second terminal of the second bi-directional switch is connected to the second terminal or the third terminal of the first switch group.

9. The UPS power supply system according to claim 8, wherein each of the first bi-directional switch and the second bi-directional switch comprises two thyristors connected in anti-parallel with each other.

10. The UPS power supply system according to claim 4, wherein the filter module comprises a sixth inductor, a seventh inductor, an eighth inductor, a fifth capacitor, a sixth capacitor and a seventh capacitor,
    wherein the sixth inductor is connected between a first input terminal of the mains supply and a fourth terminal of the first switch group, the seventh inductor is connected between a second input terminal of the mains supply and a fifth terminal of the first switch group, the eighth inductor is connected between a third input terminal of the mains supply and a sixth terminal of the first switch group, the fifth capacitor is connected between the fourth terminal of the first switch group and the ground, the sixth capacitor is connected between the fifth terminal of the first switch group and the ground, and the seventh capacitor is connected between the sixth terminal of the first switch group and the ground.

11. The UPS power supply system according to claim 1, wherein the bi-directional DC/DC module comprises a seventh switch transistor, an eighth switch transistor, a fourth inductor and a third capacitor,
    wherein a first terminal of the third capacitor is connected to a positive electrode of the battery, a second terminal of the third capacitor is connected to a negative electrode of the battery; a first terminal of the fourth inductor is connected to the positive electrode of the battery, a second terminal of the fourth inductor is connected to a second terminal of the seventh switch transistor and a first terminal of the eighth switch transistor; a first terminal of the seventh switch transistor is connected to the positive bus, and a second terminal of the eighth switch transistor is connected to the negative bus; and a third terminal of the seventh switch transistor and a third terminal of the eighth switch transistor are connected with a control signal.

\* \* \* \* \*

UNITED STATES PATENT AND TRADEMARK OFFICE
CERTIFICATE OF CORRECTION

Page 1 of 1

PATENT NO.       : 10,454,300 B2
APPLICATION NO.  : 15/602675
DATED            : October 22, 2019
INVENTOR(S)      : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 237 days.

Signed and Sealed this
Second Day of June, 2020

Andrei Iancu
*Director of the United States Patent and Trademark Office*